Patented May 7, 1946

2,399,735

UNITED STATES PATENT OFFICE 2,399,735

PHENOL-ALDEHYDE RESINS AND METHODS OF MAKING AND USING THE SAME

Mortimer T. Harvey, South Orange, N. J., assignor to The Harvel Corporation, a corporation of New Jersey No Drawing. Application November 19, 1942, Serial No. 466,187

9 Claims. (Cl. 260—3)

This invention relates to novel products and to methods for preparing the same and it is also directed to novel brake linings and methods of preparing the same.

In Patent 2,128,247, there is disclosed the treatment of cashew nut shell liquid with chlorine in order to eliminate the sulphur therefrom. The sulphur content in cashew nut shell liquid is extremely low and is less than $\frac{1}{10}$ of 1% by weight of the cashew nut shell liquid in which it occurs. In order to remove this sulphur by means of treatment with free chlorine less than 1% of chlorine by weight based on the weight of the cashew nut shell liquid treated is required. While this so-treated product will react with paraformaldehyde, furfuraldehyde, or trioxymethylene, the speed of reaction at room temperature is extremely slow so that many weeks are required to reach a gelled state. For practical purposes, therefore, a mixture of this so-treated product and any of these aldehydes is a stable mixture and is entirely unsuited for use as a cold-setting cement. However, this so-treated product may be reacted with said aldehydes to produce infusible resins by heating a mixture of the same, and these resins have the characteristic of losing much of their tensile strength at elevated temperatures.

Prior to this invention there have been made and used reaction products of certain compounds with that class of phenols in which each phenol having on its nucleus a 14 to 28 carbon atom, unsaturated hydrocarbon substituent whose unsaturation is due solely to one or more ethylenic linkages and particularly with that group of said phenols which includes those liquids derived from the Anacardiaceae family of plants and certain constituents and derivatives thereof, among which are cashew nut shell liquid, marking nut shell liquid, japanese lac, anacardic acid, cardol, anacardol, urushiol, cardanol, etc. Solid resin reaction products have been produced by reacting said phenols with an aldehyde, such as formaldehyde, paraformaldehyde, trioxymethylene, furfuraldehyde and hexa methylene tetramine. When any one of said aldehydes is used with said phenols to produce a solid resin, the application of heat is required to elevate the temperature of the reactants materially above room temperature because there is substantially no reaction between said phenols and said aldehydes at room temperature. The solid resins produced by heating a mixture of one of said aldehydes and said phenols have found a wide variety of uses. One of the characteristics of said resins, which in certain instances is a disadvantage, is that their tensile strength at elevated temperatures is materially less than their corresponding property at normal temperatures.

One of the objects of this invention is to provide novel products.

Another object of this invention is to provide a novel brake lining material.

Another object of this invention is the method for preparing my novel products.

These as well as other objects of this invention will be readily apparent from the following description and the claims which are made part of said description of the invention.

According to the present invention, one of the aforementioned class of phenols may be chlorinated by passing free chlorine therethrough. In the course of passing said free chlorine therethrough, it will be found that there is a rise in the temperature of said material being chlorinated and further that the mass becomes thicker and thicker and after a certain quantity of chlorine is absorbed thereby, it becomes practically solid. I have further discovered that said mass, after being chlorinated to the extent that it has absorbed 5% or more chlorine based on the weight of said phenol being treated, will quickly react at room temperature with either formaldehyde, trioxymethylene, paraformaldehyde or furfuraldehyde to produce within about 72 hours a substantially infusible solid resin which will retain a high binding power at elevated temperatures without softening. Said chlorinated products containing at least 5% chlorine based on the weight of said class of phenols being treated are substantially completely soluble in about twice their volume of benzine, gasoline, Varsol, etc. Said chlorinated products containing 5% or more of chlorine based on the weight of the phenol may be reacted with an aldehyde, such as furfuraldehyde, paraformaldehyde, formaldehyde, trioxymethylene or hexamethylene tetramine or a mixture of two or more of them to produce an infusible resin whose tensile strength at elevated temperatures is not materially below its tensile strength at normal temperatures. Said resins may be employed with and without rubber as binders for friction ingredients in brake linings and they may be employed as friction ingredients in said brake linings and may be in the comminuted or sheet form as desired and when in comminuted form, rubber or phenol formaldehyde resin in its ultimate state may be used as the binder.

Although said phenols may be chlorinated at elevated temperatures, I prefer to maintain said phenols being chlorinated at a temperature materially below that at which said product in the course of chlorination is converted from a liquid to a somewhat solid rubbery state after about 20% chlorine based on the weight thereof is absorbed thereby. The temperature of the product being chlorinated is therefore maintained below about 200° F. and is preferably maintained between about 70° and 160° F. In carrying out this invention, I prefer to artificially cool the phenol being treated. When the free chlorine gas is passed directly into the phenol being treated and in the absence of a solvent therefor, I prefer to maintain the phenol at between about 140° and 160° F. and generally at about 150° F. In this manner, a phenol of said class may be chlorinated to provide a liquid chlorinated product which contains between about 5% and 25% chlorine and is substantially completely soluble in twice its volume of either gasoline, benzine or Varsol and will quickly react at room temperature with trioxymethylene, formaldehyde, paraformaldehyde or furfuraldehyde to produce within about 72 hours an infusible solid resin. When a phenol of said class dissolved in Varnoline, benzol, toluene, xylene, carbon tetrachloride, monochlorbenzene or the like, is chlorinated, the chlorination may be carried out at room temperature to provide a liquid solution of a chlorinated product having between 5% to 150% of chlorine based on the quantity of said phenol being treated. Since the reaction of said phenols with chlorine is exothermic, during the chlorine addition, the mass is cooled to maintain the mass at the desired temperature.

The following are illustrative examples of the preferred methods of treating and preferred products obtained.

*Example I*

About three hundred pounds of cashew nut shell liquid at room temperature is placed in a lead lined iron vessel in which is located a cooling coil. Chlorine gas is bubbled through said cashew nut shell liquid and when its temperature reaches about 150° F., a refrigerant continuously flows through said coils to absorb the excess heat and thus maintain the temperature of this mass being chlorinated at the temperature of 150° F. The mass may be agitated by a rotary agitator. In the course of chlorination, the product thickens. By following this simple method it will be found that the chlorinated product, containing about 25% by weight of chlorine based on the weight of the cashew nut shell liquid, will be produced after between about 36 to 48 hours. The time of chlorine addition is dependent on the flow of chlorine and the degree of agitation.

*Example II*

About two hundred and fifty parts by weight of cashew nut shell liquid is dissolved in about two hundred and fifty parts by weight of petroleum distillate, known as "Varnoline." Into this solution is disposed a cooling coil through which passes a refrigerant to maintain the solution at about room temperature (70° F.) throughout the entire chlorination process during which the solution may be mechanically agitated. The chlorine is bubbled through said solution which is thus maintained at room temperature throughout the period of treatment and it has been found that by following this process the cashew nut shell liquid absorbs chlorine in the amounts set forth below after certain given periods:

| Days of 24 hours of chlorination | Chlorine taken up by cashew nut shell liquid |
|---|---|
| | *Parts by weight* |
| 1 | 74 |
| 2 | 137 |
| 3 | 227 |
| 4 | 272 |
| 5 | 370 |
| 6 | 374 |

All of said phenols, including all of those specifically mentioned herein, may be chlorinated by following the methods set forth in Examples I and II heretofore described and the extent of chlorine taken up by the phenol may be controlled by varying the time of chlorination. Where the amount of chlorine to be absorbed by said phenol is to be greater than about 25% of the weight of the phenol being chlorinated, the chlorination is preferably carried out with the phenol dissolved in a solvent. I have found that the aforesaid class of phenols, when chlorinated as above described to such an extent that the resultant chlorinated products containing upwards of about 5% of chlorine based on the weight of the phenols chlorinated will react quickly at room temperature with trioxymethylene, formaldehyde, paraformaldehyde and furfuraldehyde to produce in from about 24 to 72 hours an infusible solid resin and that said chlorinated products are completely soluble in twice their volume of benzine, gasoline and Varsol. The preferred chlorinated products are those produced by following generally the methods set forth in Example I and II whereby there may be obtained the aforesaid class of phenols chlorinated to the extent that the resulting products contain between about 5% and 150% chlorine based on the quantity of the phenol being chlorinated and all of the resulting products will be capable of reacting quickly at room temperature with either trioxymethylene, formaldehyde, paraformaldehyde and furfuraldehyde to produce in about 24 to 72 hours a solid infusible resin and are completely soluble in twice their volume of gasoline, benzine and Varsol at room temperature.

By practicing this invention of chlorinating that class of phenols in which each phenol having on its nucleus a 14 to 28 carbon atom, unsaturated hydrocarbon substituent whose unsaturation is due solely to one or more ethylenic linkages, there may be produced chlorinated products having from 5% to 150% chlorine based on the quantity by weight of the phenol being chlorinated which products, whether made at elevated temperatures or at temperatures below 200° F., have a wide variety of applications, among which are the following:

A. Reaction products of these products may be used as constituents of coatings, impregnations, binders for laminations and the like and molded articles, resins for extrusions, electrical insulations in the form of impregnated and coated woven or felted fabrics such as cloth, paper and the like, for cast forms, solvents and plasticizers, binders for molded compositions of various kinds and for abrasive elements such as sandpaper and grinding wheels, for friction elements such as brake linings and clutch facings.

B. These products may be used together with a petroleum oil such as kerosene to act as co-solvents for rotenone containing products such as derris root extract. Solutions of this type find application as insecticides.

C. They may be mixed with hexamethylene tetramine, which mixture may be heated whereby the same is converted to an intermediate reaction stage where it is of a solid rubbery nature or to its ultimate reaction stage where it is a hard solid mass. The intermediate rubbery product may be employed in the compounding of rubber and the hard solid ultimate reaction product may be comminuted into fine particles which may be employed as a filler in rubber compounds or as discreet particles dispersed throughout a friction element such as brake linings and clutch facings and in which rubber or some other binder may be employed for said particles.

D. They may be reacted at room temperature with trioxymethylene, formaldehyde, paraformaldehyde or furfuraldehyde or combinations of two or more of them to produce a cold setting cement, which will be an infusible solid resin when set. This cold setting cement may be used as a coating, binding and impregnating composition which may be applied to a base or in conjunction with fibrous material such as cotton, asbestos or the like in insulation, brake linings, clutch facings and the like.

E. Into 100 parts by weight of the 5% to 25% by weight chlorine containing chlorinated cashew nut shell liquid made in accordance with the present invention were mixed with about 12 to 20 parts by weight of furfuraldehyde at room temperature. Immediately after a uniform mixture of these ingredients is obtained, a braided or woven fibrous material such as a braided or woven asbestos web is dipped into this mix to impregnate the same throughout. Upon standing at room temperature for 10 to 12 hours or upon heating at a low temperature, such as 180°–200° F., for a shorter time, the impregnating liquid is converted to a soft rubbery solid mass and the impregnated base can be calendered or pressed to the desired size and shape. Thereafter the impregnated web is placed in an oven and heated at between about 250° and 450° F. to set the impregnating binder to a hard infusible mass. This resultant product serves as a friction element, such as a brake lining or clutch facing. This solid resin product carried by the web acts as a binder and serves as a good frictional material because it has a high friction coefficient combined with a low wear factor.

F. On a rubber mill or in a dough mixer, there are mixed intimately with each other the below materials, all parts being given by weight:

| | Parts |
|---|---|
| Asbestos fibres | 60 to 80 |
| Cork, barytes, chalk, or like fillers | 5 to 10 |
| Chlorinated cashew nut shell liquid prepared in accordance with this invention and containing about 10 to 30% chlorine based on weight of cashew nut shell liquid | 5 to 10 |
| Hexamethylene tetramine | ½ to 1 |

After this intimate mixture has been made, it is formed into sheets of the desired thickness and converted to a hard strong solid mass by baking at temperatures between 200° and 400° F. The quantity of hexamethylene tetramine may be less than 10% of the quantity of the chlorinated cashew nut shell liquid employed and may be as low as 1% thereof. The baking may be performed at temperatures as high as about 550° F. and as low as 140° F. but the time of baking will vary inversely as the temperature.

A friction element, such as a clutch facing or brake lining made in the manner aforesaid has been found to be far superior to that produced by employing polymerized cashew nut shell liquid in place of the chlorinated cashew nut shell liquid embodying the present invention. One of the salient differentiating features resides in the ability of the brake lining in which the chlorinated product is employed to retain a high binding power at elevated temperatures without softening in the course of use as compared to the corresponding characteristics of a brake lining in which the polymerized cashew nut shell liquid is employed.

G. The solution of my chlorinated cashew nut shell liquid and Varnoline may be employed as an impregnating material for woven fabrics which may be employed in brake and clutch face linings as well as other bases which may be employed as insulators and fire resistant materials. This solution may also be employed as a constituent of paints and varnishes and especially those of the heat resistant type. After the fabrics have been impregnated with this solution, they may be treated with an aldehyde either under cold setting or elevated temperature conditions to produce an infusible resin. The solvent, Varnoline, may be volatilized by heating.

H. Into 100 parts by weight of the 5% to 25% chlorine containing chlorinated cashew nut shell liquid obtained by the specific method aforedescribed and in which no solvent is employed, 8 parts by weight of paraformaldehyde were mixed in and the mass cured at from 220° F. to 275° F. for from about 10 hours to about 24 hours. The resulting product is resin-like and has various uses, for example, when cured for 24 hours at 275° F. it can be comminuted and 1 part thereof by weight mixed with two parts of rubber, two parts of sulphur, 15 parts of litharge and 2 parts of zinc oxide, and molded to the desired shape and cured in a mold at about 40 pounds of steam until set. Also this chlorinated cashew nut shell liquid-paraformaldehyde reaction product can be milled into rubber on the rubber mixing rolls, the consistency of the chlorinated cashew nut shell liquid-paraformaldehyde reaction product having been prodetermined for this purpose, by allowing it to set for a number of hours at room temperature or for a shorter time at a temperature above room temperature. The resulting rubber-chlorinated cashew nut shell liquid-paraformaldehyde can be used generally for making up rubber compositions and can be used in making brake and clutch facings of the molded and extruded types.

K. A mixture of 2 parts by weight of derris root extract and 10 parts by weight of my chlorinated cardanol made in accordance with this invention and containing between about 5% to 10% chlorine based on the weight of the cardanol is heated to obtain a solution which at normal temperatures can be thinned with kerosene in any proportions which may be as high as 200 parts.

L. A mixture of 100 parts by weight of chlorinated cashew nut shell liquid containing 5% to 25% chlorine, 1 part by weight of paraformaldehyde and 8 parts of hexamethylene tetramine is formed. After an intimate and uniform mixture is produced, it is allowed to stand until it has become plastic and then is molded to the desired shape and size and finally heated at between about 220° F. and 280° F. for about 10 to 24 hours to produce a solid infusible resin.

This application is a continuation in part of my co-pending applications Ser. No. 315,165, filed January 23, 1940, Ser. No. 335,767 and 335,768, filed May 17, 1940.

I claim:

1. The method for producing a resin comprising reacting an aldehyde selected from the group consisting of formaldehyde, paraformaldehyde, trioxymethylene and furfuraldehyde with a chlorinated phenol containing an amount of chlorine greater than about 5% by weight of said phenol which before chlorination having on its nucleus a 14 to 28 carbon atom, unsaturated hydrocarbon substituent whose unsaturation is due solely to ethylenic linkage.

2. The method for producing a resin comprising reacting an aldehyde selected from the group consisting of formaldehyde, paraformaldehyde, trioxymethylene and furfuraldehyde with chlorinated cashew nut shell liquid containing an amount of chlorine greater than about 5% by weight of said cashew nut shell liquid before chlorination.

3. The method for producing a resin comprising reacting a mixture of two aldehydes selected from the group consisting of formaldehyde, paraformaldehyde, trioxymethylene and furfuraldehyde with a chlorinated phenol containing an amount of chlorine greater than about 5% by weight of said phenol which before chlorination having on its nucleus a 14 to 28 carbon atom, unsaturated hydrocarbon substituent whose unsaturation is due solely to ethylenic linkage.

4. A resin obtained by reacting an aldehyde selected from the group consisting of formaldehyde, paraformaldehyde, trioxymethylene and furfuraldehyde with a chlorinated phenol containing an amount of chlorine greater than about 5% by weight of said phenol which before chlorination having on its nucleus a 14 to 28 carbon atom, unsaturated hydrocarbon substituent whose unsaturation is due solely to ethylenic lankage.

5. A resin obtained by reacting an aldehyde selected from the group consisting of formaldehyde, paraformaldehyde, trioxymethylene and furfuraldehyde with chlorinated cashew nut shell liquid containing an amount of chlorine greater than about 5% by weight of said liquid before chlorination.

6. A base carrying a resin obtained by reacting an aldehyde selected from the group consisting of formaldehyde, paraformaldehyde, trioxymethylene and furfuraldehyde with a chlorinated phenol containing an amount of chlorine greater than about 5% by weight of said phenol which before chlorination having on its nucleus a 14 to 28 carbon atom, unsaturated hydrocarbon substituent whose unsaturation is due solely to ethylenic linkage.

7. A friction element comprising a resin obtained by reacting an aldehyde selected from the group consisting of formaldehyde, paraformaldehyde, trioxymethylene and furfuraldehyde with a chlorinated phenol containing an amount of chlorine greater than about 5% by weight of said phenol which before chlorination having on its nucleus a 14 to 28 carbon atom, unsaturated hydrocarbon substituent whose unsaturation is due solely to ethylenic linkage.

8. A friction element comprising a resin obtained by reacting an aldehyde selected from the group consisting of formaldehyde, paraformaldehyde, trioxymethylene and furfuraldehyde with chlorinated cashew nut shell liquid containing an amount of chlorine greater than about 5% by weight of said liquid before chlorination.

9. A friction element comprising rubber and a resin obtained by reacting an aldehyde selected from the group consisting of formaldehyde, paraformaldehyde, trioxymethylene and furfuraldehyde with a chlorinated phenol containing an amount of chlorine greater than about 5% by weight of said phenol which before chlorination having on its nucleus a 14 to 28 carbon atom, unsaturated hydrocarbon substituent whose unsaturation is due solely to ethylenic linkage.

MORTIMER T. HARVEY.